(12) United States Patent
Nanda et al.

(10) Patent No.: US 9,116,698 B2
(45) Date of Patent: Aug. 25, 2015

(54) INTELLIGENT SELECTION OF OPERATING STATE UPON CHANGE OF POWER STATE

(75) Inventors: Sameer Nanda, San Jose, CA (US); David James, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1043 days.

(21) Appl. No.: 13/155,171

(22) Filed: Jun. 7, 2011

(65) Prior Publication Data
US 2015/0198998 A1 Jul. 16, 2015

(51) Int. Cl.
G06F 1/32 (2006.01)

(52) U.S. Cl.
CPC .......... *G06F 1/3234* (2013.01); *G06F 1/3203* (2013.01)

(58) Field of Classification Search
CPC .................................... G06F 1/3234
USPC ....................................... 713/323
See application file for complete search history.

(56) References Cited

U.S. PATENT DOCUMENTS

| | | | |
|---|---|---|---|
| 5,194,895 A | | 3/1993 | Bares |
| 5,809,223 A * | | 9/1998 | Lee et al. ............ 714/4.5 |
| 6,516,421 B1 | | 2/2003 | Peters |
| 7,383,457 B1 | | 6/2008 | Knight |
| 8,063,872 B2 | | 11/2011 | Forstall et al. |
| 8,578,144 B2 * | | 11/2013 | Bower et al. ............ 713/2 |
| 2007/0050654 A1 | | 3/2007 | Switzer et al. |
| 2009/0157960 A1 * | | 6/2009 | Koga ............ 711/115 |
| 2010/0153764 A1 | | 6/2010 | Pratt et al. |
| 2011/0016417 A1 * | | 1/2011 | Shiplacoff et al. ............ 715/768 |
| 2013/0082916 A1 | | 4/2013 | Dixit |

FOREIGN PATENT DOCUMENTS

WO 2003/094428 A2 11/2003

OTHER PUBLICATIONS

"Managing Power with Group Policy: Part 2 of 3", Ask the Directory Services Team, Mar. 19, 2008, 2 pages, Printed Oct. 22, 2012.
"Screen Saver Taking Longer to Start ? in Windows 7 and Vista", Windows 7 Hacker, Aug. 24, 2009, 5 pages, Printed Oct. 22, 2012.

* cited by examiner

*Primary Examiner* — Paul Yanchus, III
*Assistant Examiner* — Joshua Neveln
(74) *Attorney, Agent, or Firm* — Brake Hughes Bellermann LLP

(57) ABSTRACT

A method includes operating a computing device in a first power mode and a first operating state. The first operating state includes first operating state information stored in a volatile memory. The method includes receiving a first request to change the power mode from the first power mode to a second power mode. In response to receiving the first request, a sub-portion of the first operating state information that includes less than all of the first operating state information is stored in a non-volatile memory. The method includes receiving a second request to change the power mode from the second power mode to the first power mode. In response to receiving the second request, the computing device is restored to the first power mode, and is placed in a second operating state, by re-creating a portion of the first operating state information.

20 Claims, 9 Drawing Sheets

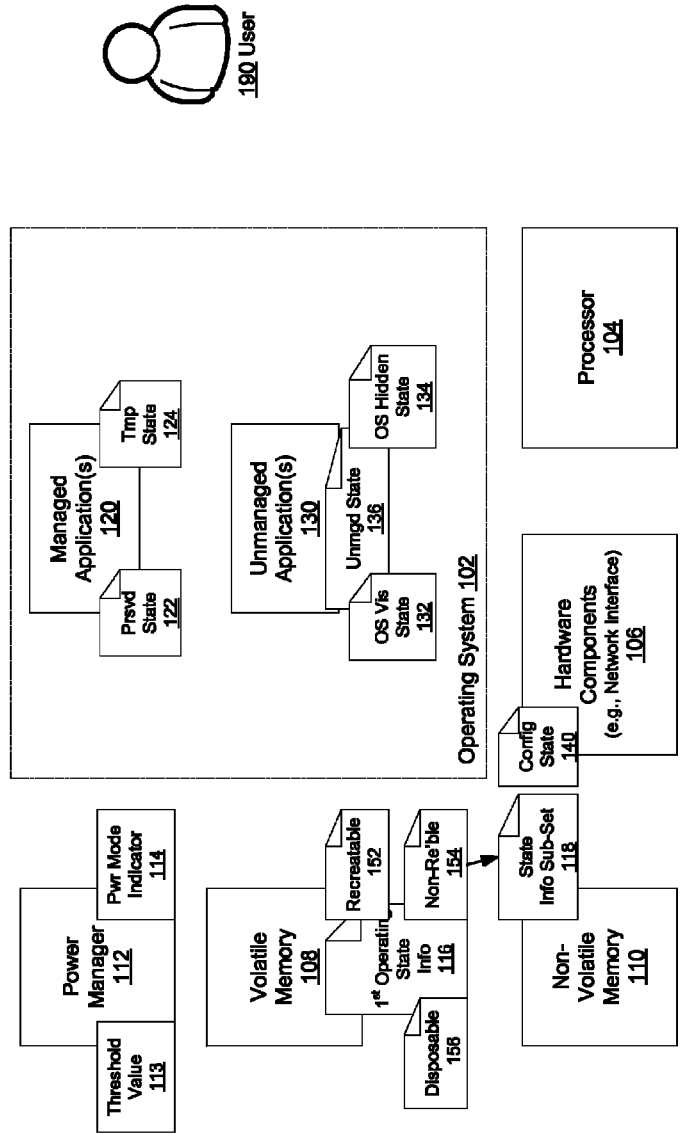

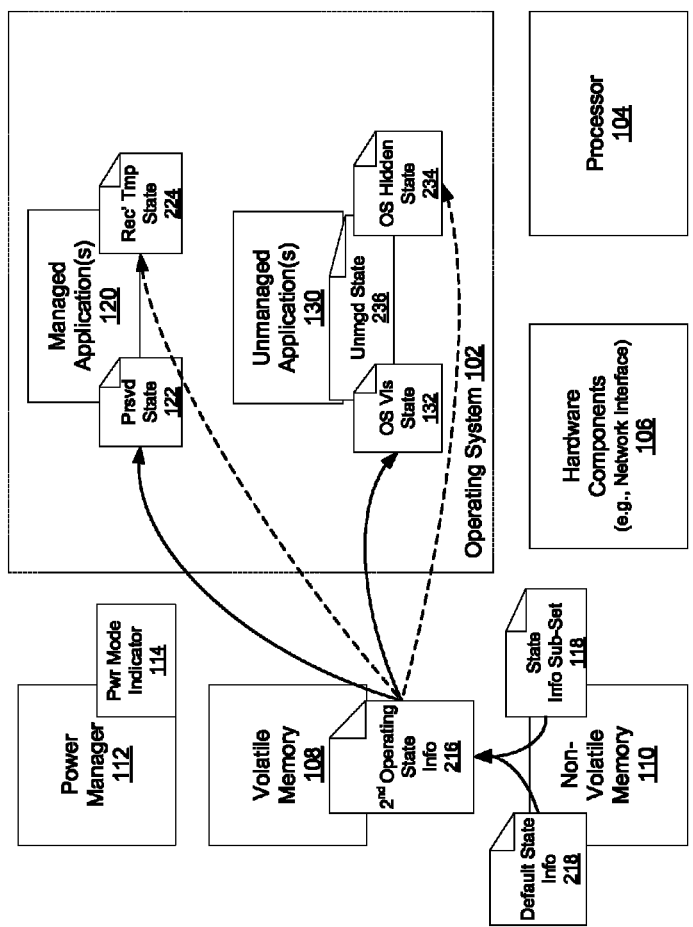

300

INTELLIGENT SELECTION OF OPERATING STATE UPON CHANGE OF POWER STATE

TECHNICAL FIELD

This description relates to the power management of a computing device, and more specifically to the intelligent selection of which operating state to save upon a change of the power state of the computing device.

BACKGROUND

Modern computing devices (e.g., desktop computers, laptops, netbooks, tablets, smartphones, etc.) can generally operate in one of a plurality of power modes or power states. These power modes may range from a "working" power mode, in which the computing device is fully powered and operational, to an "off" power mode in which the device is fully powered down and non-operational. Traditionally this "working" power mode is the default operating mode of computing devices. However, there are power modes between these two power modes (working and off) that trade-off performance characteristics of some functions in exchange for power savings or reduced power consumption.

For example, a low-power state of a computing device may be referred to as "Standby," "Sleep," "Suspend to RAM," "Suspend to Memory," or "Suspend." Advanced Configuration and Power Interface (ACPI) power state S3. In such a low-power state, aside from powering the random access memory ("RAM") that is required to restore the computing device's state, the computing device attempts to reduce or cut power to all unneeded parts of the machine (e.g., the hard disk(s) stop spinning, the display device is placed into a dark or low-power state, and peripheral devices are de-powered). Such a low-power state often is called Stand By (for computing devices running a Microsoft Windows 95®—Server 2003® operating system), or is called Sleep (for computing devices running an Apple® operating system or a Windows Vista®, Windows 7®, Windows Server 2008® operating system), or Suspend (for computing devices running a Linux® operating system). In such a state, the processing functions of the computing device are powered down, and some small amount of power is used to preserve the contents of RAM and support waking up the computing device from the low-power state into the normal, working, or full power state.

When the computing device is placed into the Standby, Sleep, or Suspend to RAM state, it typically consumes less than about 20% of the total power than is consumed with the device is in the working or full power mode. However, while power consumption is greatly reduced compared to the Working power mode, the Sleep power mode requires that power be constantly supplied and consumed in order to power or refresh the volatile memory (e.g., RAM) lest the operating state be erased from the volatile memory.

In another example implementation, a low-power state of the computing device may be referred to as "Hibernate," "Hibernation," "Safe Sleep," "Suspend to Disk," "Suspend to File," or ACPI power state S4. In such a state the contents of the computing device's RAM are written to non-volatile storage such as a hard disk, as a file or on a separate partition, before powering off the computing device. When the computing device is restarted it reloads the data that had been written to the non-volatile memory and is restored to the state it was in when hibernation was invoked. To enable hibernation, the hard disk must have sufficient free space to store all non-replaceable contents of RAM.

Such a low-power state often is called Hibernate (for computing devices running a Microsoft Windows 95®—Server 2003®, and Windows 7® operating system), Fast Sleep (for computing devices running a Microsoft Vista® operating system), Safe Sleep (for computing devices running an Apple® operating system), or Suspend to Disk (for computing devices running a Linux® operating system). When the computing device is placed into the Hibernate, Safe Sleep, or Suspend to Disk state, it typically consumes about as much power as is consumed when the device is powered off. Hibernating and later restarting is traditionally faster than closing down, later starting up, and starting all the programs that were running.

SUMMARY

According to one general aspect, a method may include operating a computing device in a first power mode and with a first operating state. In various implementations, the first operating state may include first operating state information stored in a volatile memory of the computing device. The method may also include receiving a first request to change the power mode of the computing device from the first power mode to a second power mode. In such an implementation, in response to receiving the first request, the method may include storing in a non-volatile memory of the computing device a sub-portion of the first operating state information that includes less than all of the first operating state information. In various implementations, the method may include receiving a second request to change the power mode of the computing device from the second power mode to the first power mode. In such an implementation, in response to receiving the second request, the method may include restoring the computing device to the first power mode, and placing the computing device in a second operating mode, by re-creating some, but not all, of the first operating state information, wherein the re-creation is based, at least in part, upon the stored sub-portion of the first operating state information.

According to another general aspect, an apparatus may include a volatile memory, a non-volatile memory, and a processor. The processor may operate the apparatus in a first power mode and with a first operating state, change the power mode of the apparatus from the first power mode to a second power mode, select a sub-portion, but not all, of the first operating state information stored within the volatile memory, wherein the sub-portion is to be employed to re-create some but not all of the first operating state information when the apparatus is placed in returned to the first power mode. The volatile memory to store a first operating state information associated with the first operating state. The non-volatile memory to store the selected sub-portion of the first operating state information.

According to another general aspect, an apparatus may include a computer-readable medium being tangibly embodied and including executable code. The executable code may cause the apparatus to operate the apparatus in a first power mode and in a first operating state, wherein the first operating state comprises first operating state information stored in a volatile memory of the apparatus. The code may also cause the apparatus to receive a first request to change the power mode of the apparatus from the first power mode to a second power mode. The code may also cause the apparatus to, in response to receiving the first request, store in a non-volatile memory of the apparatus a sub-portion of the first operating state information that includes less than all of the first operating state information. The code may also cause the apparatus to receive a second request to change the power mode of the apparatus from the second power mode to a first power mode. The code may also cause the apparatus to, in response to receiving the second request, restore the apparatus to the first power mode operating state and place the apparatus in a second operating mode, by re-creating some, but not all, of the first operating state information, wherein the re-creation is based, at least in part, upon the stored sub-portion of the first operating state information.

The details of one or more implementations are set forth in the accompanying drawings and the description below. Other features will be apparent from the description and drawings, and from the claims.

A system and/or method for power management, substantially as shown in and/or described in connection with at least one of the figures, as set forth more completely in the claims.

BRIEF DESCRIPTION OF THE DRAWINGS

FIG. 1a is a block diagram of an example implementation of a system showing first state information stored in a volatile memory in accordance with the disclosed subject matter.

FIG. 2b is a block diagram of an example implementation of a system showing the second state information in association with at least one application in accordance with the disclosed subject matter.

Like reference symbols in the various drawings indicate like elements.

DETAILED DESCRIPTION

Figure 1B:
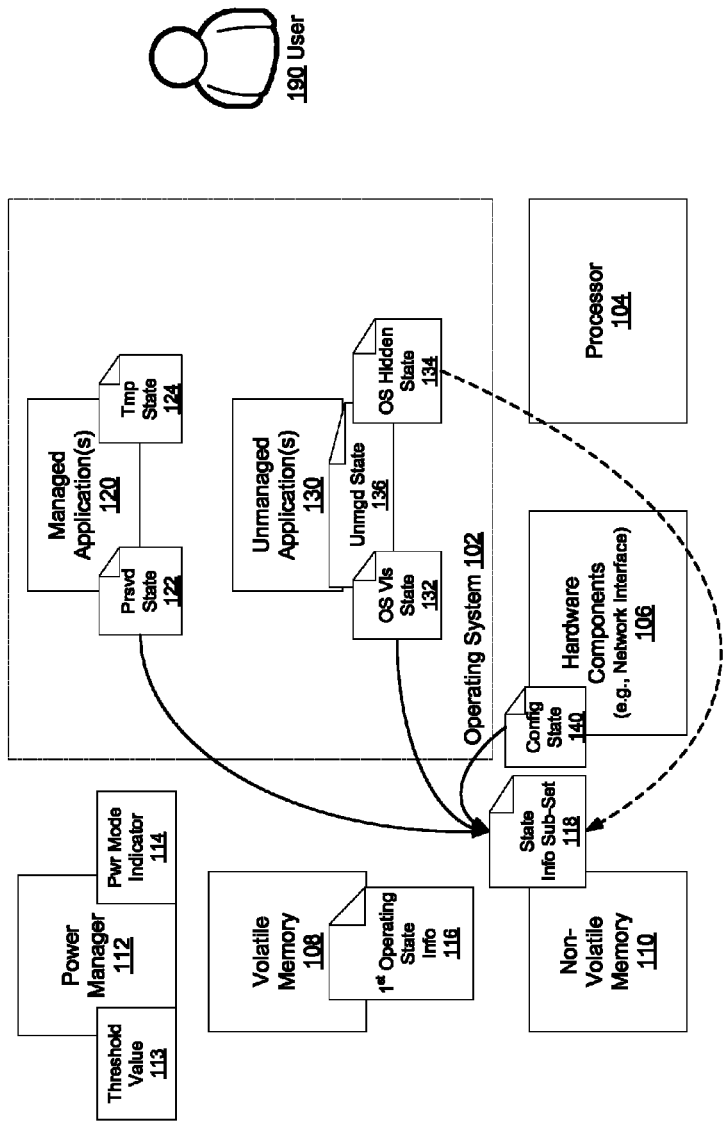
FIG. 1b is a block diagram of an example implementation of a system showing a portion of the first state information stored in a non-volatile memory in accordance with the disclosed subject matter.

FIG. 1a is a block diagram of an example implementation of a computing device 100 in accordance with the disclosed subject matter. In various implementations, the computing device 100 may include a desktop computer, laptop, netbook, tablet, smartphone, or other computing device. In some implementations, the computing device 100 may include a processor 104, which may execute an operating system 102, one or more hardware components 106 (e.g. a network interface, graphics processor, etc.), non-volatile memory 110 (e.g., a hard drive, a solid-state drive (SSD), etc.), and volatile memory 108 (e.g., RAM, general purpose registers, etc.).

As described below, in various implementations, the computing device 100 may be configured to transition from a first power mode (e.g., a Working power mode, Advanced Configuration and Power Interface (ACPI) S0 power mode, etc.) to a second power mode (e.g., Hibernate, APCI S4 power mode, etc.). In the traditional change to the Hibernate power mode a computing device would save all of the contents of the volatile memory 108 to a non-volatile memory 110, and subsequently upon exiting the Hibernate power mode the computing device 100 would returned to the original pre-Hibernate operating state by loading the saved operating state from the non-volatile memory 110 to the volatile memory 108.

However, in the illustrated implementation, the computing device 100, when entering a Hibernate power mode, may store only a portion 118 of the computing device 100's operating state when it was in the Working power mode and contents of the volatile memory 108 to the non-volatile memory 110. Upon exiting the Hibernate power mode, the computing device 100, disclosed in various implementations herein, may merely be returned to an operating state substantially equivalent to, but not identical to, the first pre-Hibernate operating state, referred to herein as a second operating state.

For example, the computing device 100 may only store a portion or sub-set 118 of the first "working" or "pre-Hibernate" operating state 116 to the non-volatile memory 110. Therefore, once power is removed from the volatile memory 108 or the device 100, the unsaved portion of the operating state (e.g., portions 152 and/or 156, etc.) may be lost, in one implementation. This transition to Hibernate or, more generally, the transition to the second power mode from the first power mode is described in more detail in regards to FIGS. 1a and 1b.

Upon the return of the power to the device 100 or the return to the Working power mode, this saved sub-portion 118 may be reloaded into the volatile memory 108. This restored sub-portion 118 may be combined with a default operating state (e.g., the initial operating state of the device after an initial booting of the device, etc.) to create a second operating state. This return from Hibernate or, more generally, the transition from the second power mode to the first power mode is described in more detail in regards to FIGS. 2a and 2b.

This second operating state may not be identical but may be substantially equivalent to the first operating state. In such an implementation, the second operating state may present the user with the applications and documents that were being executed or available when the device 100 was hibernated. Further, user entered data or other user manipulated content (e.g. movie position, displayed portion of a document, text entered into a document but not saved, etc.) may be restored. However, other operating state information which is deemed less important may be lost or may need to be recreated.

For example, all of the variables and operating state associated with an open document or web page may not be saved to non-volatile memory 110. Only the location, filename, or Universal Resource Locator (URL) of the open document may be saved to the non-volatile memory 110. Upon returning from Hibernate, the device 100 may re-open the document, creating new operating state information associated with the open document as needed, as opposed to merely having the prior operating state information stored in the non-volatile memory 110 and place that operating state directly back into volatile memory 108. In another implementation, the operating state of a program or extension (e.g., a web browser toolbar extension, etc.) may not be saved at all and a new instance of the program or extension may be created afresh upon the return to the Working power mode by the device. It is understood that the above are merely a few illustrative examples to which the disclosed subject matter is not limited.

As described above, FIG. 1a is a block diagram of an example implementation of a computing device 100 in accordance with the disclosed subject matter. In various implementations, the system or computing device 100 may include a desktop computer, laptop, netbook, tablet, smartphone or other computing device. In some implementations, the computing device 100 may include a processor 104, which may execute an operating system 102, one or more hardware components 106 (e.g. a network interface, graphics processor, etc.), non-volatile memory 110 (e.g., a hard drive, a solid-state drive (SSD), etc.), and volatile memory 108 (e.g., RAM, general purpose registers, etc.).

In the illustrated implementation, the computing device 100 may include a first set of operating state information 116 that describes or includes the various variables, data types, objects, register values, and/or memory contents currently executed or processed by the computing device 100 or the processor 104 thereof. In various implementations, the first operating state 116 may include the state of the operating system 102 and any applications (e.g., managed application(s) 120 and unmanaged applications 130, etc.) that may be executed by the processor 104.

In the illustrated implementation, this first operating state 116 may be stored within a volatile memory 108. In various implementations, this volatile memory 108 may include a swap file or virtual volatile memory that is temporarily stored in a non-volatile memory 110 and employed to expand the storage capacity of the volatile memory 108 beyond its physical bounds. Traditionally such virtual volatile memory is logically considered as physical volatile memory 108 and is treated as such herein.

In such an implementation, the first operating state 116 may include various operating state information from a number of sources. For example, a portion of the first operating state may be provided by the operating system 102 and include information about the state of executing applications (e.g., managed application(s) 120 and unmanaged applications 130, etc.), open documents (e.g., music files, videos, web pages, text documents, etc.), and user settings (e.g., which user is logged in to the device 100, a desktop theme or user interface setting, etc.). Another portion of the first operating state 116 may include the operating state of the executing applications (e.g., the operating state information 112 and 124 of the managed applications 120, the operating state information 136 of the unmanaged applications 130, etc.). Further, the first operating state information 116 may include the configuration or operating state 140 of various hardware components 106 (e.g., a network interface, a graphics processor, etc.). In various implementations, this hardware specific configuration or operating state 140 may be stored within a central volatile memory (e.g., main system RAM, etc.) or within a volatile memory component of a respective hardware component 106.

In the illustrated implementation, the first set of operating state information 116 may include a portion 154 that may not be re-created. Such operating state information may include, for example, a list of the applications executed by the device 100, the documents that are currently open, data entered by a user 190 that has not been saved (e.g. a partially filled out form, an edited document, etc.), etc. Such non-re-creatable operating state information 154 may be selected or determined to be saved within the sub-set 118 of the operating state information saved to the non-volatile memory 110 when the device 100 transitions to the second or Hibernate power mode.

In various implementations, the first set of operating state information 116 may include a portion 152 that may be re-created. Such operating information may include, for example, an open document or web page, an uncompressed bitmap image expanded from a compressed image, cached video data, portions of the operating state of an executed application (e.g., operating state 134, etc.), etc. In such an implementation, the re-creatable portion 152 of the operating state may not be saved to the non-volatile memory 110. Instead, the computing device 100 may re-create this re-creatable portion 152 of the operating state.

In another implementation, the computing device 100 may save some or all or the re-creatable portion 152. In such an implementation, the amount of re-creatable operating state information 152 included to the operating state sub-portion 118 that is saved to the non-volatile memory 110 may be determined by the size of the re-creatable portion 152. In another implementation, the selection sub-portion of the re-creatable operating state information 152 that is saved may be based upon other factors, such as, the data type operating state information, the application or portion thereof associated with the operating state information, an indication that the operating state should be preserved, the amount of system resources (e.g., processing power, network bandwidth, battery life, etc.) consumed to re-create the operating state, etc.

In some implementations, the size or amount of data of the operating state sub-portion 118 that is saved to the non-volatile memory 110 may be a function of the amount of time it takes to either place the computing device 100 into Hibernate or remove the device 100 from Hibernate. In various implementations, the amount of operating state information 118 saved to the non-volatile memory 116 may be controlled or limited by a threshold value 113.

In some implementations, this threshold value 113 may be based or measured in the number of bytes of operating state information to be stored in the non-volatile memory 116. In various implementations, the threshold value 113 may refer to the total number of bytes in the saved operating state sub-portion 118. In another implementation, the threshold value or values 113 may refer to a limit on the number of bytes that may be stored per application 120, 130 or portion of the each application's assorted operating state information (e.g., OS hidden state 134, etc.). In yet another implementation, the threshold value 113 may be based upon the amount of time (e.g., seconds, etc.) it takes to place the device 100 into or out of the Hibernation power state. In such an implementation, the amount of operating state information that may be stored in the saved operating state sub-portion 118 may be a function or based at least in part upon the speed of the various hardware components (e.g., processor 104, memories 108 and/or 110, etc.) of the device 100. It is understood that the above are merely a few illustrative examples to which the disclosed subject matter is not limited. In some implementations, this threshold value 113 may be a preconfigured value or dynamically adjusted based upon system resources (e.g., processing power, network bandwidth, battery life, etc.). In other implementations, the threshold value 113 may be user configurable.

In various implementations, the first set of operating state information 116 may include a portion 156 that may be discarded or lost when the computing device 100 ceases to provide power to the volatile memory 108 (e.g., during a transition to Hibernate, turning off the device 100, removal of the battery (not shown) without an external power source, etc.). In various implementations, this discarded portion may include all or a portion of the re-creatable operating state information 152, as described above.

In various implementations, the computing device 100 may include a power manager 112. In such an implementation, the power manager 112 may monitor the power mode in which the computing device 100 is operating (e.g., Working power mode, sleeping power mode, Hibernate power mode, Off power mode, etc.). In some implementations, an indication of the active power mode may be stored within the power mode indicator 114, which may be included by the power manager 112.

In such an implementation, when the computing device 100 is operating in a first power mode (e.g., Working power mode), a value indicating this power mode may be stored within the power mode indicator 114. In a first power mode, power may be supplied to the volatile memory 108, which can include (at least in part) the first operating state 116 described above. In a second power mode (e.g., Hibernate power mode), a sub-section or portion 118 of the first operating state information 116 may be stored within the non-volatile memory 110. Power may be removed from the volatile memory 108 and other components of the computing device 100 (e.g., the processor 104, the network interface, etc.). As such, the execution of any programs (e.g., the operating system 102, applications 120 or 130, etc.) may cease.

When the computing device 100 transitions from the first power mode to a second power mode, the power manager 112 may manage this transition. In such an implementation, the power manager 112 may determine or select which portion or portions of the first operating state information 116 are to be saved to the non-volatile memory 110. The selection, in one implementation, is described in more detail in reference to FIG. 1b. The power manager 112 may then cause this selected sub-subsection or portion 118 to be saved to the non-volatile memory 110 and the power level of the device 100 to be reduced or turned off, depending upon the implementation As described above, FIG. 1a is a block diagram of an example implementation of a computing device 100 in accordance with the disclosed subject matter. In various implementations, the computing device 100 may include a desktop computer, laptop, netbook, tablet, smartphone, or other computing device. In some implementations, the computing device 100 may include a processor 104, which may execute an operating system 102, one or more hardware components 106 (e.g. a network interface, graphics processor, etc.), non-volatile memory 110 (e.g., a hard drive, a solid-state drive (SSD), etc.), and volatile memory 108 (e.g., RAM, general purpose registers, etc.).

FIG. 1b is a block diagram of an example implementation of a computing device 100 in accordance with the disclosed subject matter. FIG. 1b illustrates the same device 100 as FIG. 1a, but various components have been removed from the illustration for explanatory purposes. Likewise, additional features have been illustrated in FIG. 1b.

In such an implementation, the operating system 102 may execute or facilitate the execution or various applications 120 and 130. In some implementations, the applications may be classified into two categories, managed applications 120 and unmanaged applications 130. In such an implementation, managed applications 120 may be capable of indicating to the operating system 102 or the power manager 112 which operating state information, associated with managed application 120, is to be preserved during Hibernate and which operating state information may be discarded or is temporary. Conversely, an unmanaged application 130 may be incapable or unwilling to indicate to operating system 102 or the power manager 112 which operating state information, associated with the unmanaged application 130, is to be preserved or discarded during Hibernate.

In one implementation, a managed application 120 may create operating state information 122 and 124, which may be included in the first operating state information 116 (illustrated separately). In such an implementation, the managed application 120 may indicate operating state information 122 that is to be preserved or saved to the non-volatile memory 110. Such operating state information 122 may include, but is not limited to: documents URLs or file-handles, unsaved changes or edits to a document, video game state, the displayed position (e.g., page 3, the 3:14 mark of a video or song, certain cells of a spreadsheet, zoom settings of an image, etc.) in a document or media file, etc. It is understood that the above are merely a few illustrative examples to which the disclosed subject matter is not limited.

The managed application 120 may also indicate operating state information 124 that need not be preserved or saved to the non-volatile memory 110 during the second power mode. Such operating state information 124 may include, but is not limited to: the contents of a saved and open document, cached video files, the baseline operating state of a video game level, etc. This temporary operating state information 124 may not be included in the saved sub-section or portion of the operating state information 118. In some implementations, the temporary operating state information 124 may be included within the saved sub-section or portion of the operating state information 118 if the power manager 112 determines that there is sufficient space within the saved state information 118 (e.g., the size of the saved operating state information 118 may be less than the threshold value 113, etc.).

In such an implementation, the managed application 120 may indicate what operating state information 122 it expects to have saved or included in the saved operating state information 118. As a result, the managed application 120 may gracefully re-create or reacquire (e.g., via downloading a cached media file, etc.) the temporary operating state information 124.

In one implementation, the unmanaged application 130 may not provide the power manager 112 with an indication of which portions of the operating state information associated with the unmanaged application 130 are important or desirable to save during the second power mode. In such an implementation, the power manager 112 may find the selection of which associated operating state information 136 to include in the saved operating state information 118 more difficult. In one implementation, the power manager 112 may simply include all of the operating state information 136 associated with the unmanaged application 130 into the saved operating state information 118.

In another implementation, the unmanaged operating state information 136 may include a portion 132 that is visible to the operating system 102 or power manager 112, and a portion 134 that is hidden from the operating system 102 or power manager 112. In one implementation, the visible unmanaged operating state information 132 may include operating state information whose values are visible to the operating system 102 (e.g., when a document is opened or closed, the position of the window of the unmanaged application 130, data placed within a clipboard, etc.). In such an implementation, the power manager 112 may include this visible unmanaged operating state information 132 within the saved operating state information 118.

Conversely, hidden unmanaged operating state information 134 may include operating state information that is not visible or hidden from the operating system 102 or the power manager 112 (e.g., unsaved user edits to any open documents or the application itself, processed open documents, undo/redo lists, etc.). In one implementation, the power manger 112 may simply include all of the hidden unmanaged operating state information 134 in the saved operating state information 118, as described above. In another implementation, the power manager 112 may select only a portion of the hidden unmanaged operating state information 134 to include in the saved operating state information 118. In such an implementation, the selection may be based upon data type of the operating state information, the size of the operating state information, the type of application (e.g., a media player may include less non-re-creatable operating state than a word processor), etc. It is understood that the above are merely a few illustrative examples to which the disclosed subject matter is not limited.

In one implementation, one or more hardware components 106 may be included by the device 100. In various implementations, the hardware components 106 may include one or more of a network interface (e.g., a wired network interface, a Wi-Fi network interface, a cellular interface, and Bluetooth interface, etc.), a graphics processor, a programmable keyboard, etc. In some implementations, one or more of these hardware components 106 may include or be associated with configuration operating state information 140. For example, a configuration operating state information 140 associated with a network interface may include an assigned network address, a domain name, authentication data, virtual network data, etc.

In such an implementation, the power manager 112 may select the configuration operating state information 140 to be included in the saved operating state information 118 stored within the non-volatile memory 110. In some implementations, this configuration operating state information 140 may be included within the first operating state information 116 and stored within the volatile memory 108. In another implementation, this configuration operating state information 140 may be included within the respective network components 106.

Figure 2A:
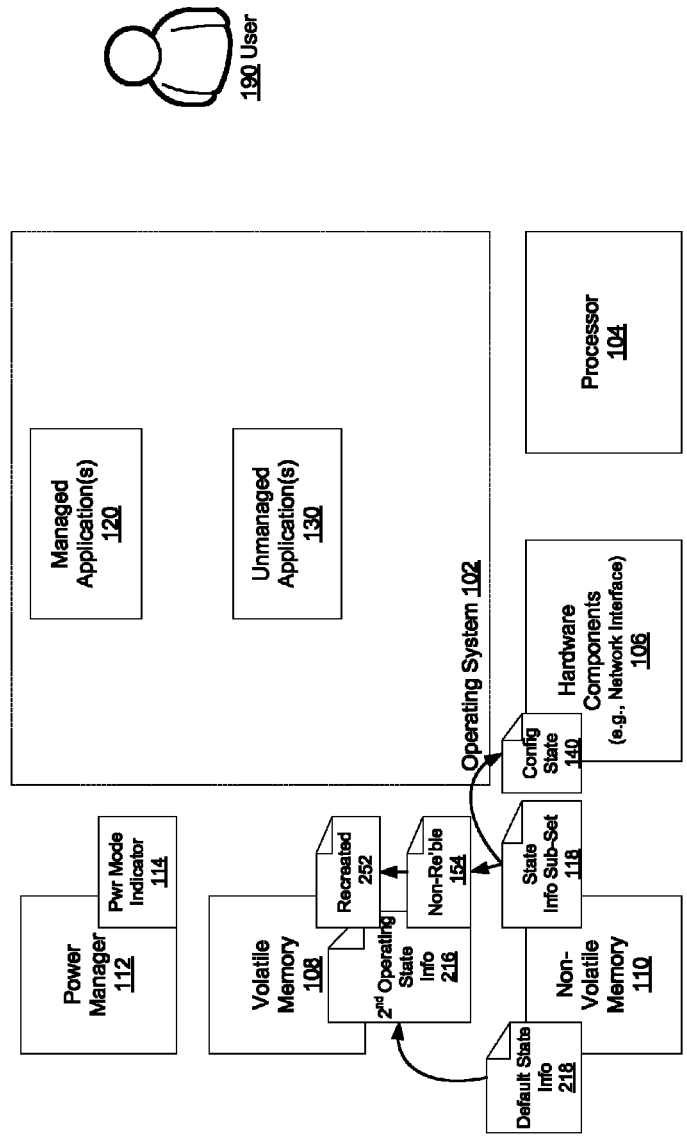
FIG. 2a is a block diagram of an example implementation of a system showing second state information stored in a volatile memory in accordance with the disclosed subject matter.

FIG. 2*a* is a block diagram of an example implementation of a computing device 100 in accordance with the disclosed subject matter. FIG. 2*a* illustrates the same device 100 as FIG. 1*a*. However, FIGS. 1*a* and 1*b* illustrate the device 100 as the device transitions from a first power mode (e.g., a Working power mode) to a second power mode (e.g., a Hibernate power mode). FIGS. 2*a* and 2*b* illustrate the device 100 as it transitions from the second power mode and returns to the first power mode, or "wakes up," as it is colloquially put.

In such an implementation, the power manager 112 may transition the device 100 from the second power mode to the first power mode. In one implementation, the power manager 112 may cause a default operating state information 218 to be loaded into the volatile memory 106. In some implementations, the default operating state information 218 may include the operating state information of the device 100 once the device 100 has initially powered on or transitioned from an Off power mode (e.g., ACPI power modes S5 or G3) to a Working power mode (e.g., ACPI power modes S0). In such an implementation, the default operating state information 218 may be saved to the non-volatile memory 110 once the device 100 has first entered the Working power mode from the Off power mode. In another implementation, the default operating state information 218 may be preconfigured at an initial firmware or software installation. It is understood that the above implementations are merely a few illustrative examples to which the disclosed subject matter is not limited.

In a less preferred implementation, the device 100 may not have the default operating state information 218 saved to the non-volatile memory 110. In such an implementation, the device 100 may create the default operating state information 218 by transitioning first to an Off power mode to then to a Working power mode. In such an implementation, the transition from the Hibernate power mode ultimately to the Working power mode may occur by first transitioning the device 100 from Hibernate to off (or a third power mode) and then secondly by transitioning the device 100 from the Off power mode to the Working power mode. After essentially rebooting the device 100, the device 100 may include the default operating state information 218. However, while such an implementation may be effective (and within the scope of the disclosed subject matter) it may not be optimal or preferred as transitioning from the Off power mode to the Working power mode is generally more time consuming than transitioning from the Hibernate Power mode directly to the Working power mode. It is understood that the above is merely one illustrative example to which the disclosed subject matter is not limited.

In various implementations, the power manager 112 may cause the saved operating state information 118 to be loaded or placed into the volatile memory 108. In one implementation, the saved operating state information 118 may modify the default operating state information 218. In such an implementation, the modified operating state information may result in the second operating state information 216, which may be substantially equivalent to the first operating state information 116 of FIGS. 1*s* and 1*b*.

As described above, the second operating state information 216 may place the device 100 in a state substantially equivalent to the state the device 100 was in prior to entering Hibernate. In various implementations, the second operating state may not be equal or identical to the first operating state. For example, the same applications 120 and 130 may be executed, the same documents may be opened, user entered data (e.g., in a document, in a fillable web form, etc.) may be restored, but other information may be recreated or lost. For example, if a video file was in the process of being downloaded from a server or had been loaded into RAM of the computing device 100 before the device 100 entered the Hibernate state, then when the device entered the Hibernate state the video file that had been loaded in RAM or that was being downloaded may be purged, such that when the device is returned from the Hibernate state the video file may need to be re-downloaded from a server. In another example, an application extension (e.g., a web browser toolbar, etc.) that had been downloaded before the device 100 entered the Hibernate state may have been purged upon entering the Hibernate state such that the application extension may need to be re-loaded or re-started to create new operating state information. In another example, an uncompressed image that deliberately was not saved to disk upon entering the Hibernate state may be recreated from a compressed image. It is understood that the above are merely a few illustrative examples to which the disclosed subject matter is not limited.

In some implementations, the saved operating state information 118 may include the non-re-creatable operating state information 154, as described above. In such an implementation, once the non-re-creatable operating state information 154 is loaded into the volatile memory 108, it may be used or employed to re-create the re-creatable operating state information 252.

As described above, such non-re-creatable operating state information 154 may include, for example, a list of the applications executed by the device 100, the documents that were open when the power modes changed, data entered by a user 190 that has not been saved (e.g. a partially filled out form, an edited document, etc.), etc. For example, in recreating the re-creatable operating state information 252, the filename of a previously open document may be retrieved from the non-re-creatable operating state information 154. This document may be re-opened. As part of re-opening the document, the information included in the document (e.g., text, formatting information, etc.) may generate operating system information. The operating system information that is created when opening the document (e.g., objects describing the text or formatting, etc. of the document, etc.) may be considered part of the re-creatable operating state information 252.

In some implementations, this re-creatable operating state information 252 may be modified by other portions of the non-re-creatable operating state information 154. For example, the non-re-creatable operating state information 154 may include user entered data (e.g., document edits, etc.) that had not been saved to the document file. The operating state information pertaining to the opened document (e.g., objects representing the text and formatting, etc. of the document, etc.) may be modified to reflect the previously un-saved user edits included in the non-re-creatable operating state information 154. In such an implementations, the non-re-creatable operating state information 154 (e.g., document filename, un-saved user edits, etc.) and the re-creatable operating state information 252 (e.g., objects representing the text and formatting, etc. of the document, etc.) may be combined to create a second operating state information 216 that is substantially equivalent to the first operating state information 116 of FIGS. 1*a* and 1*b*.

Other examples of re-creatable operating state information 252 that may be re-created from non-re-creatable operating state information 154 include: uncompressed images may be created from compressed images, video files may be re-downloaded, a streaming audio buffer may be filled by re-downloading the streaming audio data, etc. It is understood that the above are merely a few illustrative examples to which the disclosed subject matter is not limited.

In various implementations, this re-created operating state information 252 may differ from the re-creatable operating state information 152 of FIG. 1*a*. For example, in one implementation, the first operating state information may have included a cached portion of a live streaming event (e.g., audio or video, etc.). The second operating state information may re-create or cache a different portion of the live streaming event as the second operating state occurs at a later time. It is understood that the above are merely a few illustrative examples to which the disclosed subject matter is not limited.

In various implementations, the saved operating state information 118 may include hardware configuration operating state information 140, as described above. In such an implementation, the power manager 112 may re-store the hardware configuration operating state information 140 from the saved operating state information 118. In some implementations, the hardware configuration operating state information 140 may be restored directly from the saved operating state information 118. In another implementation, the hardware configuration operating state information 140 may be restored from the second operating state information 216.

FIG. 2*b* is a block diagram of an example implementation of a computing device 100 in accordance with the disclosed subject matter. FIG. 2*b* illustrates the same device 100 as FIG. 2*a*, but various components have been removed from the illustration for explanatory purposes. Likewise, additional features have been illustrated in FIG. 2*b*.

In the illustrated implementation, the second operating state information 216 may include the preserved operating state information 122 associated with the managed application 120. This preserved operating state information 122 may be employed to recreate, at least in part, a set of re-created temporary operating state information 224. In various implementations, this re-created operating state information 224 may include information, such as, cached media files, opened documents, etc. As described above, this re-created operating state information 224 may not be identical to the temporary operating state information 124 of FIG. 1*b* that was included by the device 100 prior to entering the Hibernate power mode. In some implementations, some or all of the re-created operating state information 224 may have been saved within the saved operating state information 118, as described above.

In the illustrated implementation, the second operating state information 216 may include the visible unmanaged operating state information 132 associated with the unmanaged application 130. In some implementations, the second operating state information 216 may include all or part of the second hidden unmanaged operating state information 234 associated with the unmanaged application 130. In some implementations, the all or part of the second hidden unmanaged operating state information 234 may be recreated based upon the visible unmanaged operating state information 132. For example, a document may be opened, media files may be cached, etc. The restored visible unmanaged operating state information 132 and the second hidden unmanaged operating state information 234 may both be included in the second unmanaged operating state information 236.

Figure 3:
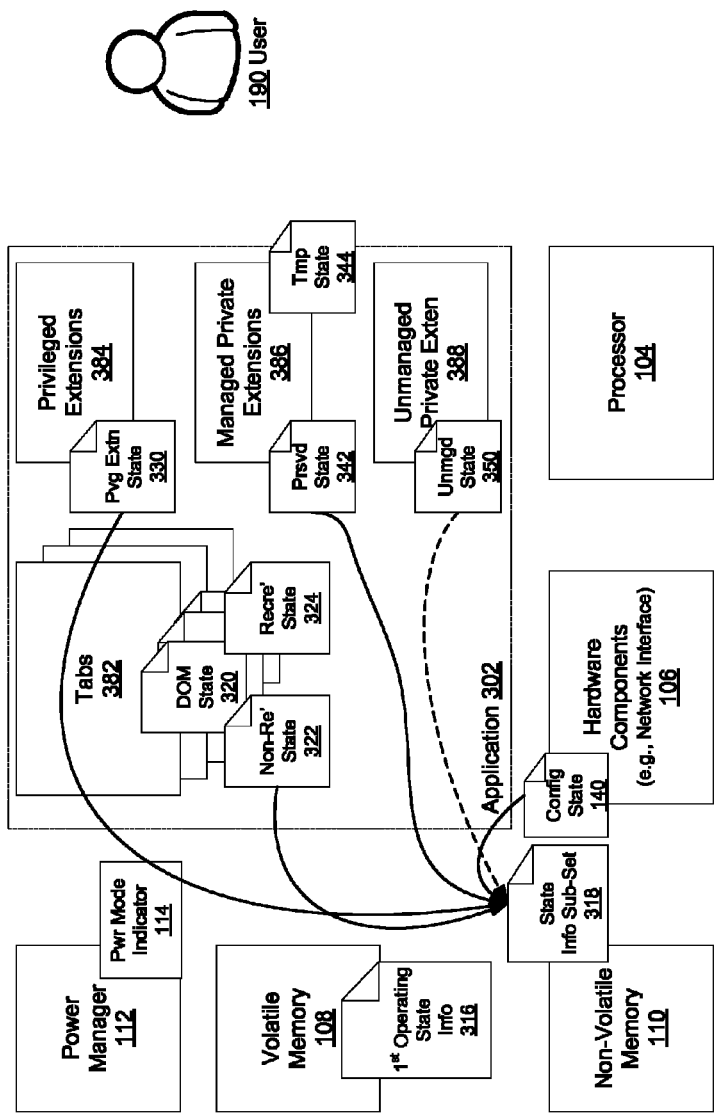
FIG. 3 is a block diagram of an example implementation of a system showing stored first state information associated with a tabbed browser in accordance with the disclosed subject matter.

FIG. 3 is a block diagram of an example implementation of a system 300 in accordance with the disclosed subject matter. In such an implementation, FIG. 3 may illustrate a system or computing device 300 that includes an operating system that executes a single application 302 (e.g. a web browser, etc.). In another implementation, FIG. 3 may be considered to illustrate the deeper or internal workings of one implementation of a managed application (as illustrated by FIG. 1*b*).

In one implementation, the device 300 may include a processor 104, volatile memory 108, non-volatile memory 110, and one or more hardware components 106. As described above, in some implementations, the device 100 may be operating initially in a first power mode (e.g., a Working power mode, etc.) and may include a first set of operating state information 316.

In such an implementation, the application 302 may include one or more tabs 382. In turn, each of these tabs 382 may display or be associated with a document (e.g., a web page, etc.). As mentioned above, the opening and manipulation of a document may create or be associated with various operating state information 320 (e.g., the document's URL, the content of the document, other documents, for example, images, associated with the document, unsaved user edits or modifications, etc.). In the illustrated implementation, the application 302 represents such operating state information 320 as a Document Object Model (DOM) set of operating state information. A DOM is a cross-platform and language-independent convention for representing and interacting with objects in Hypertext Markup Language (HTML), Extensible HTML (XHTML) and Extensible Markup Language (XML) documents. It is understood that the above is merely one illustrative example to which the disclosed subject matter is not limited.

In such an implementation, the document operating state information 320 may be logically divided into non-re-creatable operating state information 322 and re-creatable operating state information 324. In one implementation, the non-re-creatable operating state information 322 may include operating state information, such as, for example, the document name, the document URL, user entered data, user entered modifications to the document, compressed images or other data, etc. In one implementation, the re-creatable operating state information 324 may include operating state information, such as, for example, the contents of the document, uncompressed images or other data, cached media files, etc. In such an implementation, the re-creatable operating state information 324 may include operating state information that may be recreated based upon the non-re-creatable operating state information 322. Furthermore, in one implementation, the document operating state information 320 may include operating state information that may not be re-creatable but may be discarded without substantially affecting the user experience (e.g., downloaded advertisements, metadata, etc.). It is understood that the above are merely a few illustrative examples to which the disclosed subject matter is not limited.

In one implementation, the application 102 may indicate that the non-re-creatable operating state information 322 is to be saved to the saved operating state information 318 upon entering the Hibernate power mode. In various implementations, the application 102 may indicate which operating state information is not to be saved, that is, which information is the re-creatable operating state information 324 portion of the document operating state information 320 and/or which information is not re-creatable but that can be discarded without substantially affecting user experience. In such an implementation, the indication may be made to the power manager 112.

In various implementations, various extensions or plug-ins 384, 386, and 388 may be associated or executed with the application 302. In this context, an extension or plug-in includes a piece of software that adds capabilities (e.g., a toolbar, advertisement blocker, Flash execution machine, etc.) to a larger piece of software (e.g., a web browser, etc.). In various implementations, the extension may include a pre-compiled piece of executable code, a pre-compiled interpreted code (e.g., by a virtual machine, etc.) or an interpreted script (e.g., by a script execution engine).

In the illustrated implementation, such extensions may be divided into privileged extensions 384, managed private extensions 386, and unmanaged private extensions 388. In one implementation, a privileged extension 384 may include an extension that allows the application 302 privileged or intimate access to the inner workings (e.g., variables, operating state, etc.) of the extension 384. In one implementation, a managed private extension 386 may include an extension that does not provide the application 302 with intimate access to the inner workings of the extension 386, but does indicate to the application 302 or power manager 112 which operating state information should be preserved or saved to the saved operating state information 318 during the Hibernate power mode. In one implementation, an unmanaged private extension 388 may include an extension that neither provides the application 302 with intimate access to the inner workings of the extension 386, nor indicates which operating state information should be preserved or saved to the saved operating state information 318 during the Hibernate power mode.

In various implementations, the privileged extension 384 may be associated with privileged operating state information 330. As described above, the application 302 or the power manager 112 may have sufficient access to this privileged operating state information 330 to determine which portions of the privileged operating state information 330 should be preserved to the saved operating state information 318. In some implementations, all of the privileged operating state information 330 may be preserved.

In various implementations, the managed private extension 386 may be associated with preserved operating state information 342 and temporary operating state information 344. As described above, the managed private extension 386 may indicate to the application 302 or the power manager 112 which operating state information associated with the extension 386 should be preserved in the saved operating state information 318. In such an implementation, the temporary operating state information 344 may not be saved, similarly to the temporary operating state information 224 associated with the managed application 120 of FIG. 1b.

In some implementations, the unmanaged private extension 388 may be associated with unmanaged operating state information 350. Similarly to the unmanaged state operating information 136 associated with the unmanaged application 130 of FIG. 1b, the application 302 may or may not be able to determine which portions of the unmanaged operating state information 350 should be preserved during the Hibernate power mode. In one implementation, all of the unmanaged operating state information 350 may be preserved. In another implementation, the application 302 or power manager 112 may attempt to select portions of the unmanaged operating state information 350 based upon various criteria (e.g., data type, size, a threshold value, most recently used, etc.). In another implementation, none of the unmanaged operating state information 350 may be preserved.

In such an implementation, the application 302 may rely on or make use of the ability of an extension (e.g., unmanaged extension 388) to exit and restart independently of the host application 302. For example, a toolbar extension may be capable of exiting when the device 100 exits the Working power mode, and restarting when the device 100 reenters the Working power mode after being in Hibernate. In such an implementation, the operating state information associated with the toolbar (or other extension) may not be preserved during Hibernate. It is understood that the above is merely one illustrative example to which the disclosed subject matter is not limited.

It is also understood that the above mentioned sets of operating state information 320, 330, 342, 344, and 350 may be included within the first operating state information 316 and are shown separately for illustrative purposes. Further, in various implementations, the hardware configuration operating state information 140 may be included in the saved operating state information 318, as described above.

Figure 4:
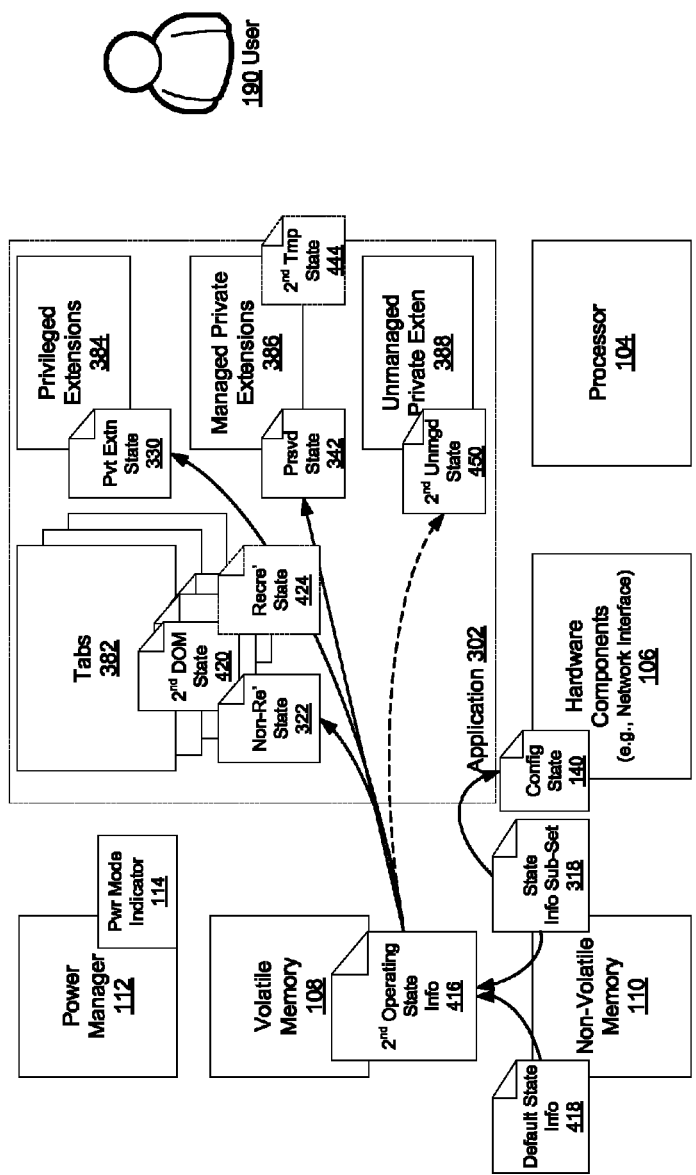
FIG. 4 is a block diagram of an example implementation of a system showing stored second state information associated with a tabbed browser in accordance with the disclosed subject matter.

FIG. 4 is a block diagram of an example implementation of a computing device 300 in accordance with the disclosed subject matter. FIG. 4 illustrates the same device 300 as FIG. 3. However, FIG. 3 illustrates the device 300 as it transitions from a first power mode (e.g., a Working power mode) to a second power mode (e.g., a Hibernate power mode). FIG. 4 illustrates the device 300 as it transitions from the second power mode and returns to the first power mode.

In one implementation, the device 300 may include a default set of operating state information 418, similar to the default operating state information 218 of FIGS. 2a and 2b. The saved operating state information 318 may be loaded from the non-volatile memory 110 to the volatile memory 108, as described above. In such an implementation, the second set of operating state information 416 may be created.

In various implementations, the second set of operating state information 416 may include the non-re-creatable operating state information 322, the privileged operating state information 330, and the preserved operating state information 342. Based upon the non-re-creatable operating state information 322 the application 302 may create the re-creatable operating state information 424 and/or the second document operating state information 420. Likewise, the managed private extension 386 may create the second temporary operating state information 444.

In various implementations, the second set of operating state information 416 may include some or all of the unmanaged operating state information 450. In another implementation, as described above, the unmanaged private extension 388 may be restarted and may create the second unmanaged operating state information 450. It is understood that the above are merely a few illustrative examples to which the disclosed subject matter is not limited.

As described above, the hardware configuration operating state information 140 may be included by the saved operating state information 318 or the second operating state information 416. In various implementations, the one or more hardware components 106 may include hardware components whose hardware configuration operating state (e.g., of network interfaces, etc.) is preserved and whose hardware configuration operating state (e.g., of a Universal Serial Bus (USB) controller, etc.) is preserved. In such an implementation, the hardware components 106 may function similarly to the managed and unmanaged applications (e.g., applications 120 and 130) and extensions (e.g., extensions 386 and 388). In such an implementation, the power manager 112 may preserve the hardware configuration operating state information 140 of various hardware components 106 based upon the function of the respective hardware component (e.g., of the network interface, graphics processor, bus interface, etc.) and based on the effect the loss of operating state information may have upon the device 100 when the device exits the Hibernate state or based on the effect the loss of operating state information may have on the experience of the user 190 when the device exits the Hibernate state. It is understood that the above are merely a few illustrative examples to which the disclosed subject matter is not limited.

Figure 5:
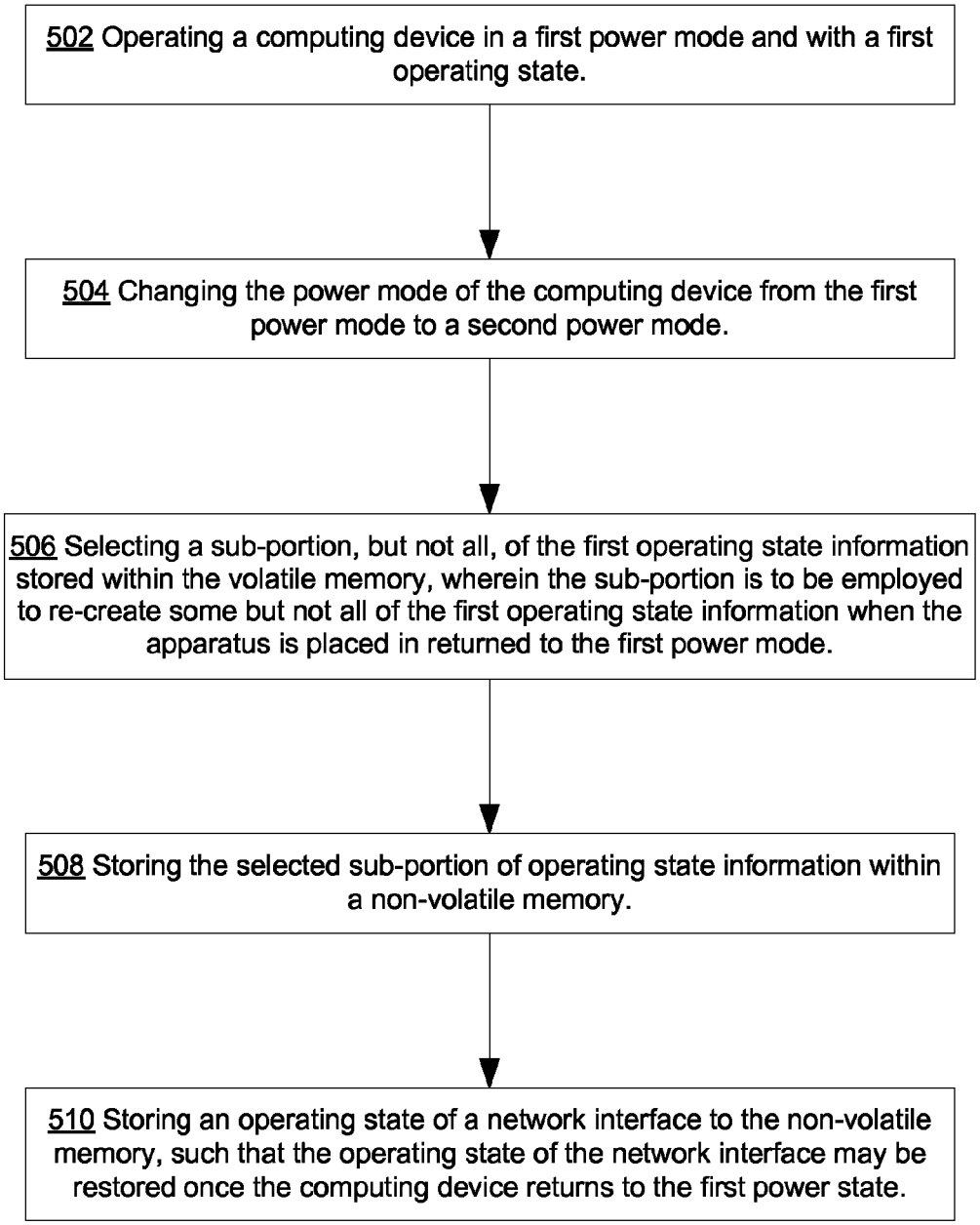
FIG. 5 is a flowchart of an example implementation of a technique for storing state information during a transition from a first power mode to a second power mode in accordance with the disclosed subject matter.

FIG. 5 is a flow chart of an example implementation of a technique in accordance with the disclosed subject matter. In various implementations, the technique 500 may be used or produced by the systems such as those of FIG. 1a, 1b, 3, or 7. It is understood that the above are merely a few illustrative examples to which the disclosed subject matter is not limited. It is understood that the disclosed subject matter is not limited to the ordering of or number of actions illustrated by technique 500.

Block 502 illustrates that, in one implementation, a computing device may be operated in a first power mode and with a first operating state. In some implementations, the first power mode may include a Working power mode, as described above. In various implementations, one or more of the action(s) illustrated by Block 502 may be performed by the apparatuses or systems of FIG. 1a, 1b, 3, or 7, the processor 104 of FIG. 1a, 1b, or 3, as described above.

Block 504 illustrates that, in one implementation, the power mode of the computing device may be changed from the first power mode to a second power mode. In some implementations, the first power mode may include a Working power mode, as described above. In some implementations, the second power mode may include a Hibernate power mode, as described above. In various implementations, one or more of the action(s) illustrated by Block 504 may be performed by the apparatuses or systems of FIG. 1a, 1b, 3, or 7, the power manger 112 of FIG. 1a, 1b, or 3, as described above.

Block 506 illustrates that, in one implementation, a sub-portion, but not all, of the operating state information stored within a volatile memory of the computing device may be selected or saved to later be employed to re-create some but not all of the first operating state information when the apparatus is placed in returned to the first power mode, as described above. In one implementation, the second operating state may be substantially equivalent, but not identical, to the first operating state. In some implementations, selecting the sub-portion of the operating state information may include selecting operating state information associated with one or more non-re-creatable values of one or more documents displayed by the computing device, as described above. In some implementations, selecting the sub-portion of the operating state information may include receiving, from a program executed by the computing device, an indication of which sub-portion of the operating state information associated with the program is to be included in the selected sub-portion, as described above. In another implementation, selecting the sub-portion of the operating state information may include discarding operating state information that exceeds a threshold size, as described above. As described above, in various implementations, the threshold size may be measured in various ways, for example, total bytes saved, multiple thresholds for each application, tab, etc., or in the amount of time saving would add to transitioning the device to/from the Hibernate power mode, etc., as described above. In various implementations, the selected sub-portion may include operating state information including: a resource locator of a document that was displayed in the first operating state, a position (e.g., page 3, the 3:14 mark of a video or song, certain cells of a spreadsheet, zoom settings of an image, etc.) of the document displayed in the first operating state, and data associated with the document and entered by a user, as described above. In various implementations, one or more of the action(s) illustrated by Block 506 may be performed by the apparatuses or systems of FIG. 1a, 1b, 3, or 7, the power manager 112 of FIG. 1a, 1b, or 3, as described above.

Block 508 illustrates that, in one implementation, the selected sub-portion of operating state information may be stored or saved within a non-volatile memory, as described above. In various implementations, one or more of the action (s) illustrated by Block 508 may be performed by the apparatuses or systems of FIG. 1a, 1b, 3, or 7, the power manager 112 of FIG. 1a, 1b, or 3, as described above.

Block 510 illustrates that, in one implementation, an operating state of a network interface may be stored or saved to the non-volatile memory, such that the operating state of the network interface may be restored once the computing device returns to the first power state, as described above. In various implementations, one or more of the action(s) illustrated by Block 510 may be performed by the apparatuses or systems of FIG. 1a, 1b, 3, or 7, the power manager 112 of FIG. 1a, 1b, or 3, as described above.

Figure 6:
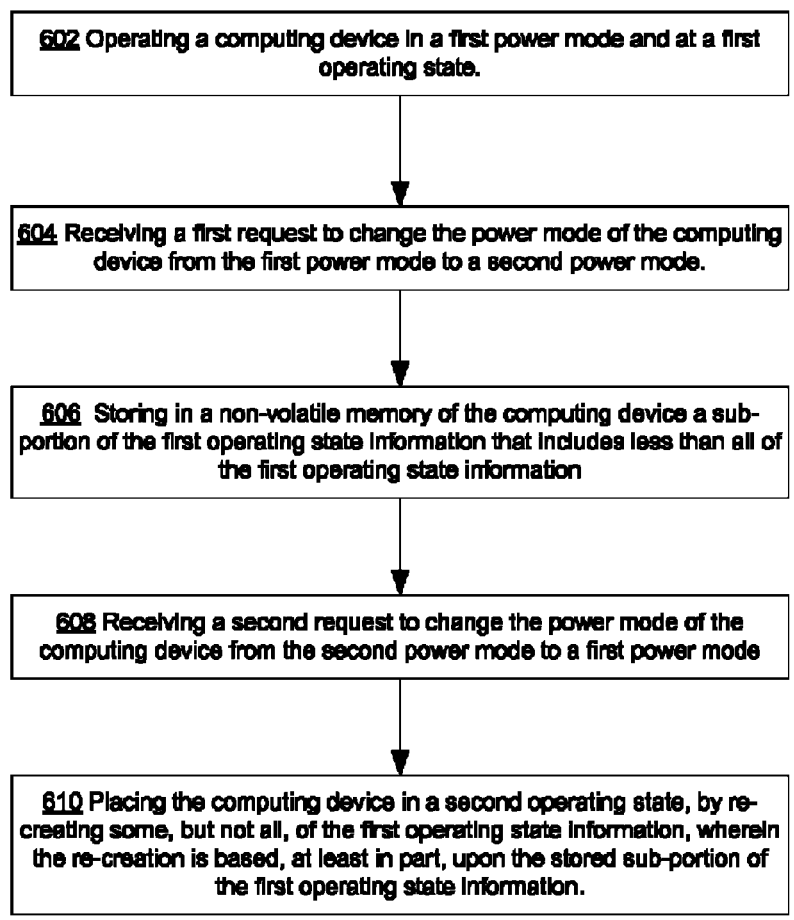
FIG. 6 is a flowchart of an example implementation of a technique for returning to a first power mode from a second power mode in accordance with the disclosed subject matter.

FIG. 6 is a flow chart of an example implementation of a technique in accordance with the disclosed subject matter. In various implementations, the technique 600 may be used or produced by the systems such as those of FIG. 2a, 2b, 4, or 7. It is understood that the above are merely a few illustrative examples to which the disclosed subject matter is not limited. It is understood that the disclosed subject matter is not limited to the ordering of or number of actions illustrated by technique 600.

Block 602 illustrates that, in one implementation, a computing device may be operated in a first power mode and with a first operating state, as described above. In some implementations, the first power mode may include a Working power mode, as described above. In various implementations, one or more of the action(s) illustrated by Block 602 may be performed by the apparatuses or systems of FIG. 2a, 2b, 4, or 7, the processor 104 of FIG. 2a, 2b, or 4, as described above.

Block 604 illustrates that, in one implementation, the computing device may receive a first request to change the power mode of the computing device from the first power mode to a second power mode, as described above. In response to the request the computing device may change from the first power mode to a second power mode, as described above. In various implementations, one or more of the action(s) illustrated by Block 604 may be performed by the apparatuses or systems of FIG. 2a, 2b, 4, or 7, the power manager 112 of FIG. 2a, 2b, or 4, as described above.

Block 606 illustrates that, in one implementation, changing the computing device from the first power mode to the second power mode may include storing in a non-volatile memory of the computing device a sub-portion of the first operating state information that includes less than all of the first operating state information, as described above. In some implementations, the first power mode may include a Working power mode, as described above. In some implementations, the first power mode may include a Suspend or a Hibernate power mode, as described above. In various implementations, one or more of the action(s) illustrated by Block 606 may be performed by the apparatuses or systems of FIG. 2a, 2b, 4, or 7, the power manager 112 of FIG. 2a, 2b, or 4, as described above.

Block 608 illustrates that, in one implementation, the computing device may receive a second request to change the power mode of the computing device from the second power mode to a first power mode, as described above. In various implementations, one or more of the action(s) illustrated by Block 608 may be performed by the apparatuses or systems of FIG. 2a, 2b, 4, or 7, the power manager 112 of FIG. 2a, 2b, or 4, as described above.

Block 610 illustrates that, in one implementation, the computing device may be placed in a second operating state by re-creating some, but not all, of the first operating state information, wherein the re-creation is based, at least in part, upon the stored sub-portion of the first operating state information, as described above. In various implementations, placing the computing device in the second operating state may include using the saved sub-portion of the operating state information, as described above. In some implementations, placing the computing device in the second operating state may include loading a document indicated by the stored selected sub-portion of operating state information, retrieving the values of one or more text fields associated with the document, where the retrieved values of the text field(s) is/are stored in the saved sub-portion of operating state information, and entering the retrieved value(s) into the one or more text fields of the document, as described above.

In some implementations, placing the computing device into the second operating state may include loading a document indicated by the saved sub-portion of operating state information, and restoring the Document Object Model (DOM) state of the loaded document to the first operating state based upon operating state information included by the saved sub-portion of operating state information, as described above. In another implementation, placing the computing device in the second operating state may include determining that a program was being executed by the computing device while in the first operating state, determining that operating state information associated with the program is not included by the saved sub-portion of operating state information, and executing the program, but not restoring the operating state of the program to the first operating state, as described above.

In yet another implementation, returning the computing device to the first power mode may include placing the computing device in a default operating state, as described above. In such an implementation, placing the computing device in the second operating state may include modifying the default operating state of the computing device based upon the saved sub-portion of the operating state information of the first operating state, as described above. In various implementations, one or more of the action(s) illustrated by Block 608 may be performed by the apparatuses or systems of FIG. 2a, 2b, 4, or 7, the processor 104 or power manager 112 of FIG. 2a, 2b, or 4, as described above.

Figure 7:
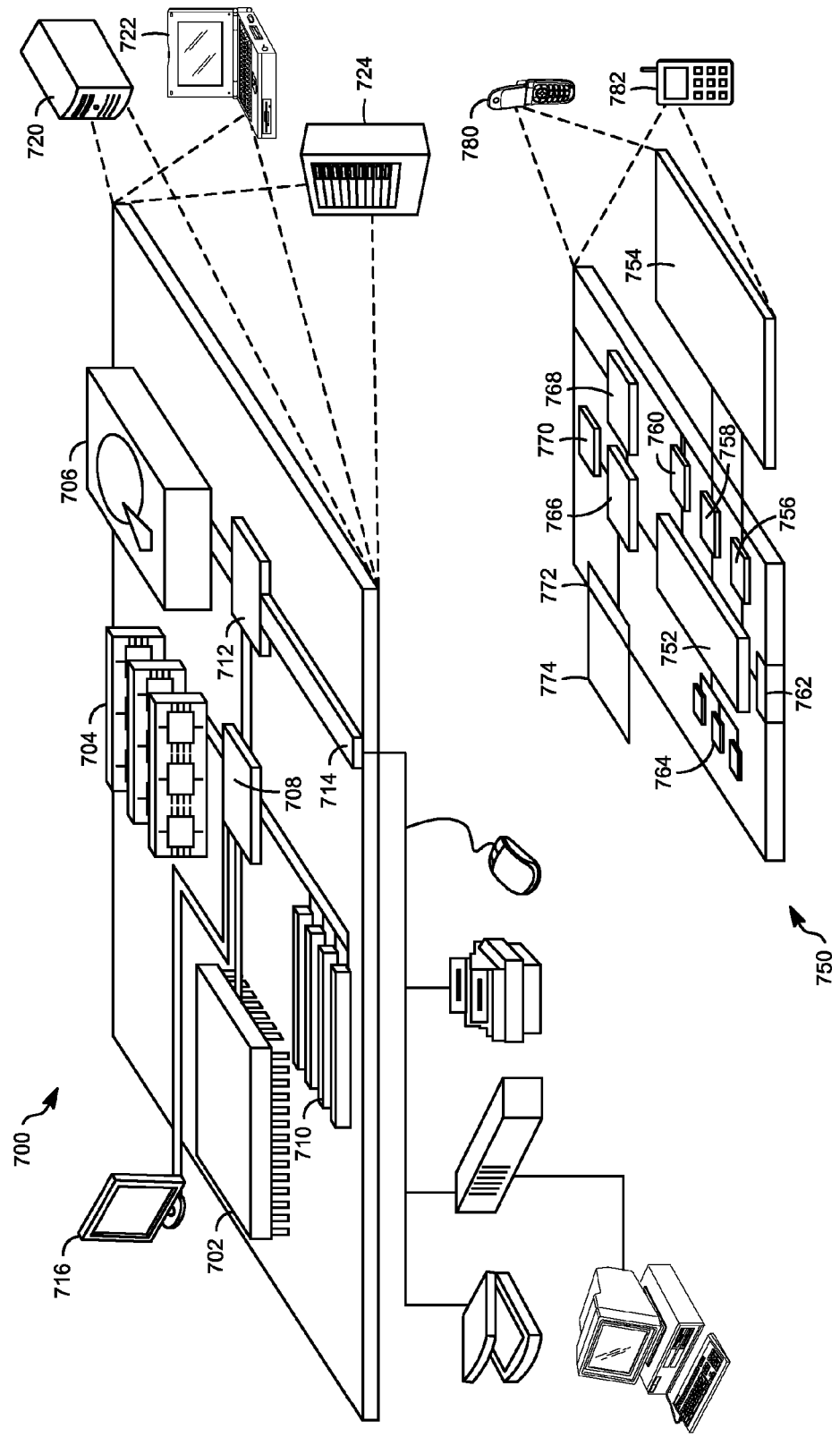
FIG. 7 is a block diagram of a computer device and a mobile computer device that can be used to implement the techniques described herein.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   operating a computing device in a first power mode and in a first operating state, wherein the first operating state comprises first operating state information stored in a volatile memory of the computing device;
   receiving a first request to change the power mode of the computing device from the first power mode to a second power mode;
   in response to receiving the first request, storing in a non-volatile memory of the computing device a sub-portion of the first operating state information that includes preserved state information as indicated by at least one application being executed by the computing device, the preserved state information including non-recreate information and re-create information, the re-create information indicating information, separate from the non-recreate information, used to re-create a portion of the first operating state information;
   receiving a second request to change the power mode of the computing device from the second power mode to the first power mode; and
   in response to receiving the second request:
      restoring the computing device to the first power mode, and
      placing the computing device in a second operating state based upon the stored sub-portion of the first operating state information and unpreserved state information associated with the at least one application.

2. The method of claim 1, wherein placing the computing device in the second operating state comprises:
   creating operating state information that was not included in the sub-portion of the first operating state information, wherein the creation of the operating state information is based on the stored sub-portion of the first operating state information; and
   loading at least some of the sub-portion of the first operating state information and at least some of the created operating state information into the volatile memory.

3. The method of claim 1, further comprising:
   storing an operating state of a network interface associated with the computing device within the non-volatile memory, such that the operating state of the network interface may be restored once the computing device returns to the first power state.

4. The method of claim 1, wherein selecting the sub-portion of the first operating state information includes selecting operating state information that includes a filename of a document open during the first operating state, and an unsaved data entered by a user and associated with the document.

5. The method of claim 1, wherein the first power mode includes a Working power mode, and wherein the second power mode includes a Hibernate power mode.

6. The method of claim 1, wherein selecting the a sub-portion of the first operating state information includes receiving, from a program executed by the computing device, an indication of which sub-portion of the operating state information associated with the program is to be included in the selected sub-portion.

7. The method of claim 1, wherein the selected sub-portion includes operating state information selected from the group consisting of:
   a resource locator of a document that was accessed while in the first operating state,
   an indicator of which position of the document was most recently accessed in the first operating state, and
   data associated with the document and entered by a user.

8. The method of claim 1, wherein placing the computing device in the second operating state includes:
   loading a document indicated by the stored selected sub-portion of operating state information;
   retrieving the values of one or more text fields associated with the document, wherein the retrieved values are stored in the saved sub-portion of the first operating state information; and
   entering the retrieved values into the one or more text fields of the document.

9. The method of claim 1, wherein placing the computing device in the second operating state includes:
   loading a document indicated by the saved sub-portion of first operating state information;
   restoring a Document Object Model (DOM) state of the loaded document to the first operating state based upon operating state information included by the saved sub-portion of first operating state information.

10. The method of claim 1, wherein placing the computing device in the second operating state includes:
   determining that a program was being executed by the computing device while in the first operating state;
   determining that operating state information associated with the program is not included by the saved sub-portion of first operating state information; and
   executing the program, but not restoring the operating state of the program to the first operating state.

11. The method of claim 1, wherein returning the computing device to a first power mode includes:
   placing the computing device in a default operating state; and
   wherein placing the computing device in a second operating state includes:
      modifying the default operating state of the computing device based upon the saved sub-portion of the first operating state information.

12. An apparatus comprising:
   a volatile memory to store a first operating state information associated with a first operating state;
   a non-volatile memory; and
   a processor to:
      operate the apparatus in a first power mode and with the first operating state,
      change the power mode of the apparatus from the first power mode to a second power mode,
      execute at least one application;
      select a sub-portion of the first operating state information stored within the volatile memory, wherein
         the sub-portion includes preserved state information as indicated by the at least one application, and
         the preserved state information including non-recreate information and re-create information, the re-create information indicating information, separate from the non-recreate information, used to re-create a portion of the first operating state information, and
      store the selected sub-portion of the first operating state information in the non-volatile memory.

13. The apparatus of claim 12, wherein the processor is further configured to:
   return the apparatus to the first power mode; and
   place the apparatus in a second operating state based on the saved sub-portion of the first operating state information and unpreserved state information associated with the at least one application.

14. The apparatus of claim 13, wherein the processor when placing the apparatus in the second operating state:
   loads a document indicated by the stored selected sub-portion of the first operating state information;
   retrieves the values of one or more text fields associated with the document, wherein the retrieved values are stored in the saved sub-portion of the first operating state information; and
   enter the retrieved values into the one or more text fields of the document.

15. The apparatus of claim 12, wherein the non-volatile memory further stores an operating state of a network interface, such that the operating state of the network interface may be restored once the apparatus returns to the first power state.

16. The apparatus of claim 12, wherein the processor selects operating state information associated with one or more non-re-creatable values of one or more documents accessed by the apparatus.

17. The apparatus of claim 12, wherein the processor is configured to receive, from a program executed by the processor, an indication of which sub-portion of the operating state information associated with the program are to be included in the selected sub-portion.

18. The apparatus of claim 12, wherein the selected sub-portion includes operating state information selected from the group consisting of:
   a resource locator of a document that was displayed in the first operating state,
   a position of the document displayed in the first operating state, and
   data associated with the document and entered by a user.

19. The apparatus of claim 12, wherein the processor is configured to discard operating state information that exceeds a threshold number of bytes.

20. A non-transitory computer-readable medium including executable code that causes an apparatus to:
   operate the apparatus in a first power mode and in a first operating state, wherein the first operating state comprises first operating state information stored in a volatile memory of the apparatus;
   receive a first request to change the power mode of the apparatus from the first power mode to a second power mode;
   in response to receiving the first request, store in a non-volatile memory of the apparatus a sub-portion of the first operating state information that includes preserved state information as indicated by at least one application being executed by the apparatus, the preserved state information including non-recreate information and re-create information, the re-create information indicating information, separate from the non-recreate information, used to re-create a portion of the first operating state information;
   receive a second request to change the power mode of the apparatus from the second power mode to a first power mode; and
   in response to receiving the second request:
      restore the apparatus to the first power mode operating state, and
      place the apparatus in a second operating state based upon the stored sub-portion of the first operating state information and unpreserved state information associated with the at least one application.

* * * * *

UNITED STATES PATENT AND TRADEMARK OFFICE
CERTIFICATE OF CORRECTION

| | | |
|---|---|---|
| PATENT NO. | : 9,116,698 B2 | Page 1 of 1 |
| APPLICATION NO. | : 13/155171 | |
| DATED | : August 25, 2015 | |
| INVENTOR(S) | : Sameer Nanda et al. | |

It is certified that error appears in the above-identified patent and that said Letters Patent is hereby corrected as shown below:

In the claims,

In column 22, line 38, in claim 6, after "selecting the" delete "a".

Signed and Sealed this
Ninth Day of February, 2016

Michelle K. Lee
*Director of the United States Patent and Trademark Office*